(12) United States Patent
Ardyna et al.

(10) Patent No.: US 6,339,202 B1
(45) Date of Patent: *Jan. 15, 2002

(54) COMPOSITE MATERIAL INSULATIVE JACKET FOR GENERATOR CIRCUIT-BREAKERS

(75) Inventors: Henri Ardyna, Eveux; Marc Durieu, Civrieux; François Biquez, Brignais, all of (FR)

(73) Assignee: GEC Alsthom T&D SA, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/039,333

(22) Filed: Mar. 16, 1998

(30) Foreign Application Priority Data

Mar. 17, 1997 (FR) ............................................. 97 03182

(51) Int. Cl.⁷ ............................................... H01H 33/75
(52) U.S. Cl. .......................................... 218/97; 218/155
(58) Field of Search ........................... 218/97, 118, 134, 218/135, 136, 137, 138, 155, 139

(56) References Cited

U.S. PATENT DOCUMENTS

| | | | | |
|---|---|---|---|---|
| 3,271,702 A | * | 9/1966 | Book ........................... | 218/97 |
| 3,447,047 A | * | 5/1969 | Lindsay ........................ | 218/97 |
| 3,549,841 A | * | 12/1970 | McCloud et al. .............. | 218/97 |
| 3,626,123 A | * | 12/1971 | Pflanz .......................... | 218/97 |
| 3,970,809 A | * | 7/1976 | Mitchell ...................... | 218/148 |
| 4,037,187 A | * | 7/1977 | Himi .......................... | 335/202 |
| 4,045,634 A | | 8/1977 | Nakano et al. | |
| 4,702,498 A | | 10/1987 | Mueller et al. | |
| 5,594,224 A | * | 1/1997 | Tanimizu et al. ........... | 218/134 |

FOREIGN PATENT DOCUMENTS

| | | |
|---|---|---|
| FR | 1411192 | 8/1965 |
| WO | WO9522158 | 8/1995 |

* cited by examiner

*Primary Examiner*—Lincoln Donovan
(74) *Attorney, Agent, or Firm*—Sughrue, Mion, Zinn, Macpeak & Seas, PLLC

(57) ABSTRACT

A composite material tubular insulative jacket contains a dielectric gas under pressure and electrical switchgear and includes a metallic collar fixed to one end at least and provided with a member for fixing the collar to a support member. A seal is disposed between the support member and the jacket. A metallic insert is attached to this end of the jacket by an interference fit and by gluing, the seal being disposed between the insert and the support member.

9 Claims, 1 Drawing Sheet

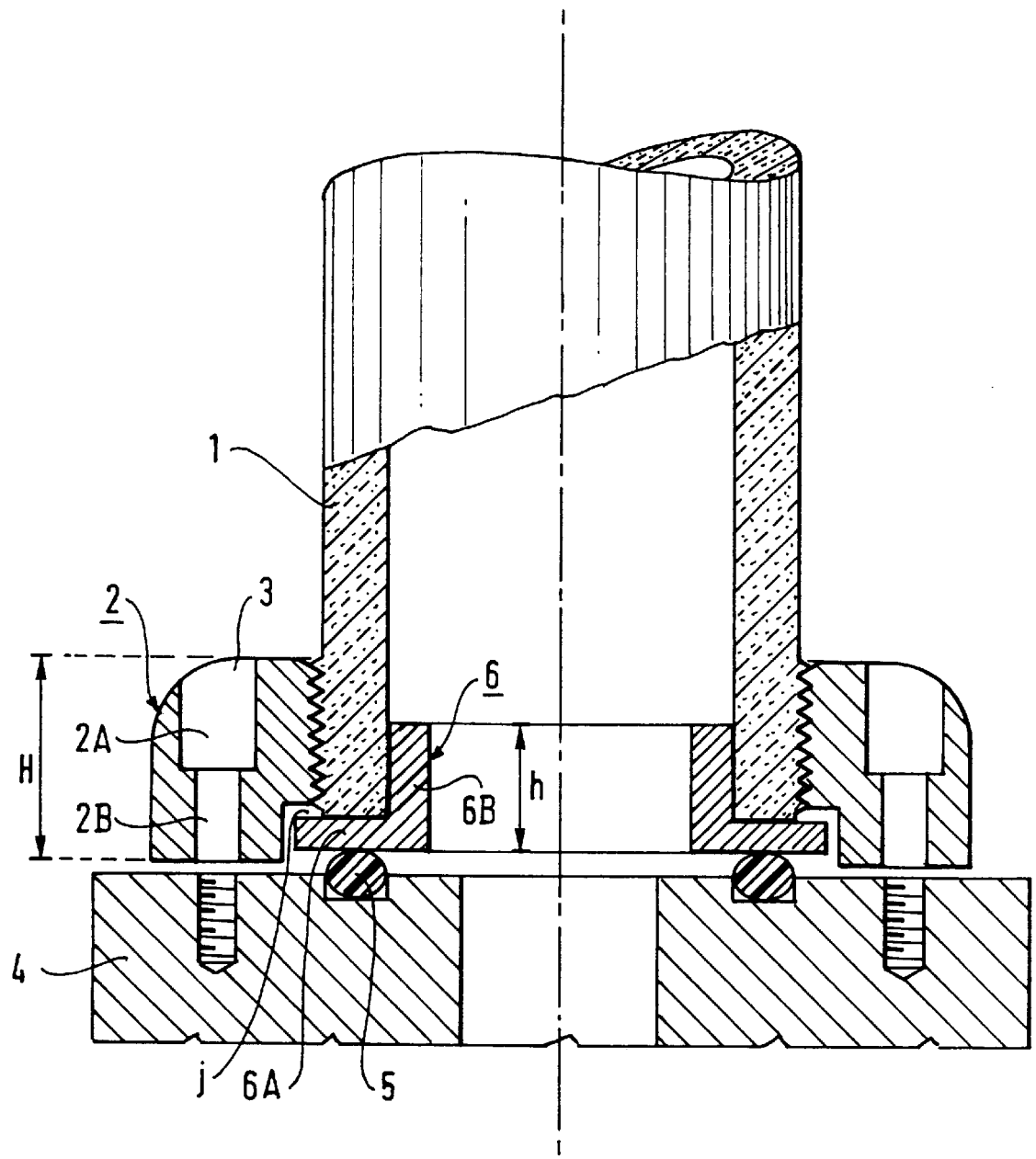

COMPOSITE MATERIAL INSULATIVE JACKET FOR GENERATOR CIRCUIT-BREAKERS

BACKGROUND OF THE INVENTION

1. Field of the Invention

The present invention concerns a composite material insulative jacket for generator circuit-breakers.

To be more precise it concerns a composite material tubular insulative jacket adapted to contain a dielectric gas under pressure and electrical switchgear and having a metal collar fixed to at least one end provided with a member for fixing the collar to a support member, a seal being disposed between the support member and the jacket.

By composite material is meant a plastics material reinforced with a woven fabric or filaments, for example epoxy resin reinforced with glass fibers.

2. Description of the Prior Art

Patent document FR-2 735 898 filed Jun. 20, 1995 describes fixing the collar to the insulative jacket by screwing the latter directly to the jacket and disposing a seal between the collar and the insulative jacket. However, an assembly of this kind does not assure a good seal between the collar and the insulative jacket and can be used only if the electrical switchgear contained in the jacket does not require a precise dielectric gas pressure.

In the prior art, to obtain a good seal between the collar and the insulative jacket, the collar is therefore attached to the composite material jacket by means of an interference fit and by gluing, to be more precise to the front end surface of the latter and to a part of its outside surface. This mode of attachment is essential to assuring a good seal between the collar and the composite material jacket. The collar is designed to be tightened onto the support member, generally by screwing, with a seal disposed between the collar and the support member. The interference fit and gluing therefore assure two functions: mechanical retention and sealing.

An insulative jacket of the above kind can be exposed to high temperatures. This occurs in particular if the electrical switchgear contained in it is a generator circuit-breaker. Unlike high-tension line circuit-breakers, generator circuit-breakers disposed in electrical power generating facilities carry the full rated current continuously. Their continuous operating temperature is the order of 100° C.

This high temperature subjects the interference fit/glued connection to excessive stresses. This leads to problems with the glue creeping and a poor seal.

The invention solves this problem by separating the mechanical retention and sealing functions.

SUMMARY OF THE INVENTION

To this end, in accordance with the invention, a metallic insert is attached to the end of the jacket by an interference fit and by gluing, the seal being disposed between the insert and the support member.

The collar therefore assures the mechanical retention function and the insert assures the sealing function.

Apart from the reliability of the seal, the insert being subjected to only very low mechanical stresses, one advantage of the invention is that it facilitates design and manufacture, each function corresponding to a well-defined geometrical area and there being no interference between these two areas.

It is also possible to use for gluing the insert a glue having less demanding mechanical characteristics than those used in the prior art.

In the preferred embodiment:

the collar has a first tubular part screwed and glued to the outside surface of the jacket and extended by a second tubular part of greater inside diameter and projecting from the end of the jacket once the collar has been fitted, and the metallic insert has an annular part fixed to the front end face of the jacket and a tubular part fixed to the inside surface of the jacket.

The collar and the insert are preferably made of aluminum.

The insert can equally be made of amagnetic stainless steel.

The mechanical stresses on the connection between the insert and the insulative jacket are particularly low if the height of the insert is less than or equal to 0.8 times the height of the collar.

The invention is described in more detail below with reference to the single figure, which shows a preferred embodiment of the invention.

BRIEF DESCRIPTION OF THE DRAWING

The FIGURE is a view partly in longitudinal section of part of an insulative jacket in accordance with the invention.

DETAILED DESCRIPTION OF THE PREFERRED EMBODIMENT

The composite material tubular insulative jacket 1 adapted to contain a dielectric gas under pressure and electrical switchgear, to be more precise a generator circuit-breaker, includes a metallic, preferably aluminum, collar 2 fixed to one end at least and in practise to each end. The collar 2 has an arrangement 3 for fixing the collar 2 to a support member 4, this arrangement generally being a bore adapted to receive a screwing arrangement for clamping the collar 2 against the support member 4. A seal 5 is disposed between the support member 4 and the jacket 1 in a groove in the support member 4 to provide a seal between the jacket 1 and the support member 4.

In accordance with the invention, a metallic, preferably aluminum or amagnetic stainless steel, insert 6 is attached to this end of the jacket 1 by an interference fit and by gluing, the seal 5 being disposed between the insert 6 and the support member 4.

To be more precise, the collar 2 has a first tubular part 2A screwed and glued to the outside surface of the jacket 1 and extended by a second tubular part 2B having a larger inside diameter and projecting beyond the end of the jacket 1 once the collar has been fitted. The first part 2A and the corresponding screwthread have dimensions such that there is a clearance j between the front end face of the jacket 1 and the end of the first part 2A near that face.

This clearance allows correct positioning of the insert 6 against the front end face of the jacket 1 without abutting against the collar 2. The insert 6 has an annular part 6A attached to the front end face of the jacket 1 by means of an interference fit and by gluing and a tubular part 6B attached to the inside surface of the jacket 1 by means of an interference fit and by gluing.

Finite element calculations have shown that the connection of the insert 6 to the jacket is subject to particularly low mechanical stresses if the height h of the insert 6 is less than or equal to 0.8 times the height H of the collar 2.

What is claimed is:

1. An insulative jacket assembly for containing a dielectric gas under pressure and electrical switchgear, and which is attached to a metallic support member, said jacket assembly comprising:
- a tubular jacket made of composite material;
- a retainer assembly including a metallic collar fitted circumferentially around a portion of said tubular jacket proximate an open end of said tubular jacket, said retainer assembly for securing said jacket to the support member;
- a metallic insert having a tubular portion inserted into an inside surface of said tubular jacket at said open end of said tubular jacket and having an annular portion attached to the front end face of said jacket adjacent to said open end; and
- a seal disposed between said annular portion of the insert and the support member, wherein said collar comprises:
  - a first tubular part having a first inside diameter and fitted to said jacket by being screwed and glued; and
  - a second tubular part having a second inside diameter which is greater than said first inside diameter so that said second tubular part is not fitted to said jacket,
- and wherein said second tubular part extends from the front end face of said jacket once said collar has been fitted.

2. The jacket assembly claimed in claim 1 wherein said collar is made of aluminum.

3. The jacket assembly claimed in claim 1 wherein said insert is made of aluminum.

4. The jacket assembly claimed in claim 1 wherein said insert is made of non-magnetic stainless steel.

5. The jacket assembly claimed in claim 1 wherein the height of said insert is less than or equal to 0.8 times the height of said collar.

6. A method for retaining and sealing an open end of a tubular insulative jacket to a metallic support member, the method comprising:
- fitting a metallic collar, equipped to receive fixing members, proximate to the open end of said tubular jacket, by screwing and gluing said collar to an outside surface of said jacket;
- attaching a tubular portion of a metallic insert to the open end of said tubular jacket by gluing and by an interference fit with an inner sidewall of said jacket, said insert having an annular portion extending outwardly to cover the end face at said open end of said jacket, said collar and said insert being separated by a clearance space along the outer surface of said jacket;
- disposing a seal in a groove of the metallic support member, so as to be squeezed between said annular part of said insert and said support member; and
- attaching said jacket by said collar to the support member with said fixing members.

7. The jacket assembly claimed in claim 1, wherein a clearance exists between said annular part of the metallic insert and said second tubular part of the collar.

8. The jacket assembly claimed in claim 1, wherein said first and second tubular parts include holes for receiving fixing members operative to fix said collar to said support member.

9. An insulative jacket assembly for containing a dielectric gas under pressure and electrical switchgear, and which is attached to a metallic support member, said jacket assembly comprising:
- a tubular jacket made of composite material;
- a retainer assembly including a metallic collar fitted circumferentially around a portion of said tubular jacket proximate an open end of said tubular jacket, said retainer assembly for securing said jacket to the support member;
- a metallic insert having a tubular portion inserted into an inside surface of said tubular jacket at said open end of said tubular jacket and having an annular portion attached to the front end face of said jacket adjacent to said open end; and
- a seal disposed between said annular portion of the insert and the support member,
- wherein said metallic insert is interference fit into said inside surface of said tubular jacket at said open end.

* * * * *